US012794255B2

(12) United States Patent
Ide et al.

(10) Patent No.: US 12,794,255 B2
(45) Date of Patent: Nov. 10, 2026

(54) STORAGE BATTERY MANAGEMENT DEVICE, STORAGE BATTERY MANAGEMENT METHOD, AND RECORDING MEDIUM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Makoto Ide, Tokyo (JP); Mami Mizutani, Tokyo (JP); Yukitaka Monden, Kawasaki Kanagawa (JP); Masako Kiuchi, Tokyo (JP); Takenori Kobayashi, Tokyo (JP); Takahiro Kase, Kawasaki Kanagawa (JP); Kenji Mitsumoto, Tokyo (JP); Yoshihisa Sumida, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 706 days.

(21) Appl. No.: 18/261,163

(22) PCT Filed: Jan. 19, 2021

(86) PCT No.: PCT/JP2021/001599
§ 371 (c)(1),
(2) Date: Jul. 12, 2023

(87) PCT Pub. No.: WO2022/157817
PCT Pub. Date: Jul. 28, 2022

(65) Prior Publication Data

US 2024/0088688 A1 Mar. 14, 2024

(51) Int. Cl.
*H02J 7/84* (2026.01)
*H01M 10/48* (2006.01)

(52) U.S. Cl.
CPC ............ *H02J 7/84* (2026.01); *H01M 10/488* (2013.01)

(58) Field of Classification Search
CPC ...... H02J 7/84; H02J 7/50; H02J 7/00; H01M 10/488; H01M 10/42; H01M 10/48; Y02E 60/10
See application file for complete search history.

(56) References Cited

U.S. PATENT DOCUMENTS

2007/0063675 A1* 3/2007 Walline ............... H01M 10/488 320/132
2011/0218703 A1 9/2011 Uchida
(Continued)

FOREIGN PATENT DOCUMENTS

JP 2010-111276 A 5/2010
JP 2014-139725 A 7/2014
(Continued)

*Primary Examiner* — Jamara A Franklin
(74) *Attorney, Agent, or Firm* — Finnegan, Henderson, Farabow, Garrett & Dunner, LLP

(57) ABSTRACT

A storage battery management device according to one embodiment includes a hardware processor that causes a display device to display first remaining life information and second remaining life information. The first remaining life information indicates current remaining life of a storage battery system. The first remaining life information is calculated on the basis of a state of health (SOH) of each of multiple storage battery modules constituting the storage battery system. The second remaining life information indicates remaining life of the storage battery system and corresponds to a case where one or more of the multiple storage battery modules are replaced with one or more other storage battery modules. The second remaining life information is calculated on the basis of an SOH of each storage battery module not being replaced and an SOH of each of the one or more other storage battery modules.

8 Claims, 14 Drawing Sheets

(56) References Cited

U.S. PATENT DOCUMENTS

| | | | |
|---|---|---|---|
| 2014/0159920 | A1 | 6/2014 | Furui et al. |
| 2017/0139014 | A1 | 5/2017 | Yamamoto et al. |
| 2018/0222343 | A1 | 8/2018 | Uchida |

FOREIGN PATENT DOCUMENTS

| | | | |
|---|---|---|---|
| JP | 2014-525840 | A | 10/2014 |
| JP | 2018-128769 | A | 8/2018 |
| WO | WO 2016/135913 | A1 | 9/2016 |

* cited by examiner (a)

(b)

| CURRENT LIFE OF STORAGE BATTERY SYSTEM: 2021/04 | | |
|---|---|---|
| | MAINTENANCE PLAN 1 | MAINTENANCE PLAN 2 |
| REPLACEMENT TIME | 2020/12 | 2021/02 |
| REPLACEMENT TARGET | MODULE A→NEW ARTICLE | MODULE A, B→NEW ARTICLE |
| REPLACEMENT COST | 300,000 YEN | 500,000 YEN |
| LIFE OF REPLACED STORAGE BATTERY SYSTEM | 2021/07 | 2021/09 |
| LIFE EXTENSION EFFECT | THREE MONTHS | FIVE MONTHS |

STORAGE BATTERY MANAGEMENT DEVICE, STORAGE BATTERY MANAGEMENT METHOD, AND RECORDING MEDIUM

CROSS-REFERENCE TO RELATED APPLICATIONS

This application is national stage application of International Application No. PCT/JP2021/001599, filed on Jan. 19, 2021, which designates the United States, incorporated herein by reference.

FIELD

Embodiments described herein relate generally to a storage battery management device, a storage battery management method, and a recording medium.

BACKGROUND

In recent years, a storage battery system including multiple storage battery modules has been used as, for example, a backup power supply or a power storage device by renewable energy power generation. Then, the storage battery module gradually degrades over time.

Therefore, in the conventional technique, for example, a state of health (SOH: degradation state) of the storage battery module is monitored, and, when a storage battery module whose SOH indicates degradation is found, the storage battery module is replaced with a new storage battery module.

DETAILED DESCRIPTION

A storage battery management device according to one embodiment includes a hardware processor connected to a memory. The hardware processor is configured to function as a display control unit to cause a display device to display first remaining life information and second remaining life information in response to an operation performed by using a user interface screen. The first remaining life information indicates current remaining life of a storage battery system. The first remaining life information is calculated on the basis of a state of health (SOH) of each of multiple storage battery modules constituting the storage battery system. The second remaining life information indicates remaining life of the storage battery system. The second remaining life information corresponds to a case where one or more of the multiple storage battery modules are replaced with one or more other storage battery modules. The second remaining life information is calculated on the basis of an SOH of each storage battery module not being replaced and an SOH of each of the one or more other storage battery modules.

Hereinafter, embodiments (first to sixth embodiments) of a storage battery management device, a storage battery management method, and a program according to the present invention will be described with reference to the drawings.

First Embodiment

Figure 1:
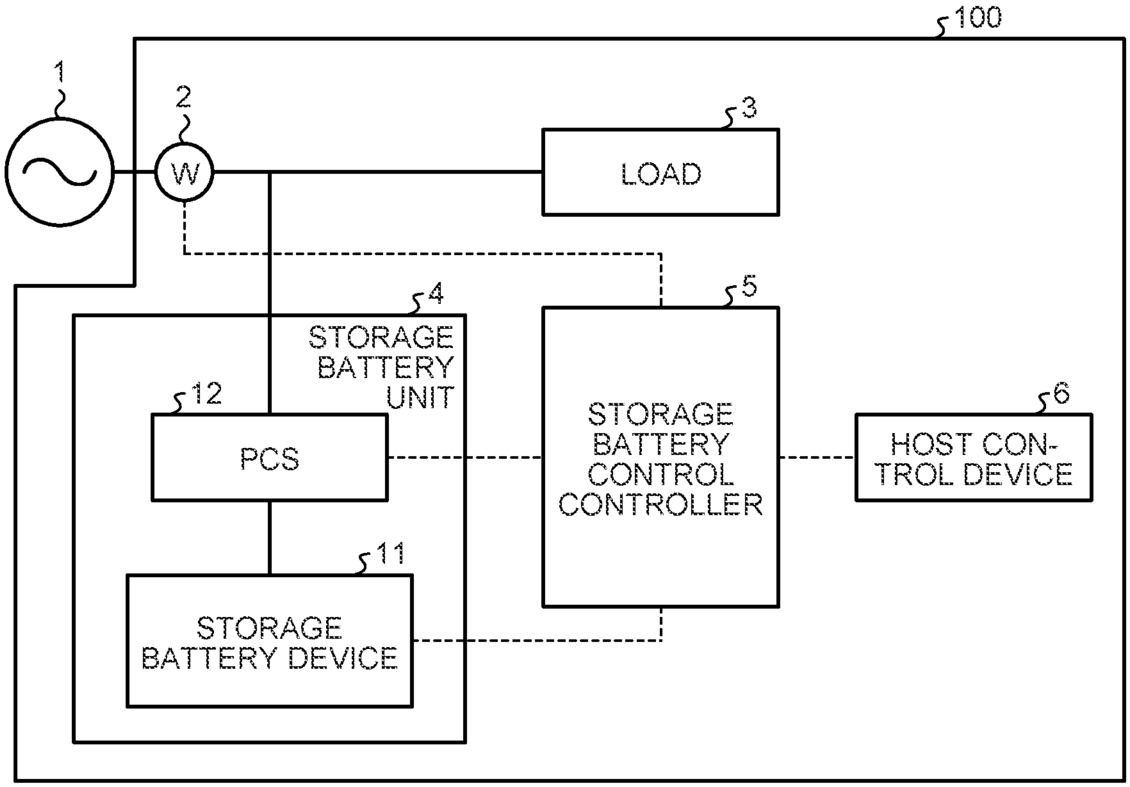
FIG. 1 is an overall configuration diagram illustrating an outline of a storage battery system of a first embodiment.

FIG. 1 is an overall configuration diagram illustrating an outline of a storage battery system 100 according to a first embodiment. For example, as illustrated in FIG. 1, the storage battery system 100 includes a power meter 2, a storage battery unit 4, a storage battery control controller 5, and a host control device 6. Note that the configuration of the storage battery system 100 is not limited to this, and the configuration of individual devices constituting the storage battery system 100 is also not limited to the following.

A commercial power supply 1 supplies commercial power. The power meter 2 measures power supplied from the commercial power supply 1. A load 3 is a device that consumes the power.

The storage battery unit 4 charges the power of the commercial power supply 1 on the basis of a measurement result of the power meter 2, and discharges the power to supply the power to the load 3 when the power supply from the commercial power supply 1 is stopped.

The storage battery control controller 5 performs local control of the storage battery unit 4. The host control device 6 performs remote control of the storage battery control controller 5.

In the above configuration, the load 3 normally operates by receiving power supply from the commercial power supply 1, whereas operates by receiving power supply from the storage battery unit 4 when the power supply from the commercial power supply 1 is stopped.

Although the above description represents a case where the storage battery unit 4 is operated as a backup power supply, the present invention can be similarly applied to a case where power of the storage battery unit 4 is superimposed and supplied in addition to power supplied from the commercial power supply 1 at the time of peak shift for power load leveling. In addition, the present invention can also be applied to a case where power quality (voltage, frequency, or the like) is stabilized in a case where power is generated by renewable energy (energy by sunlight, solar heat, hydraulic power, wind power, biomass, geothermal heat, or the like).

Figure 2:
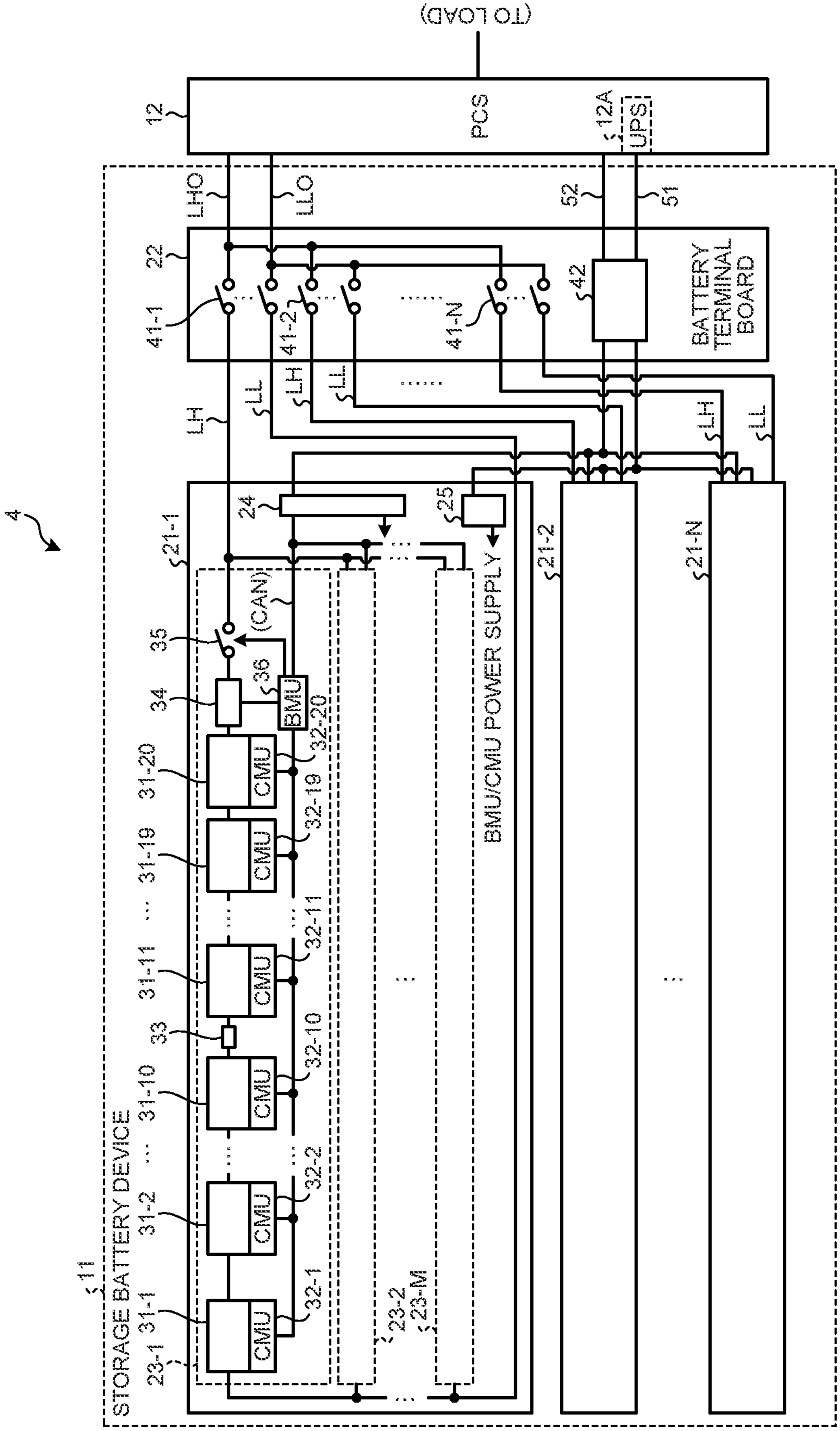
FIG. 2 is a configuration block diagram of a storage battery unit of the first embodiment.

FIG. 2 is a configuration block diagram of the storage battery unit 4 of the first embodiment. For example, as illustrated in FIG. 2, the storage battery unit 4 roughly includes a storage battery device 11 that stores power, and a power conditioning system (PCS) 12 that converts DC power supplied from the storage battery device 11 into AC power having a desired power quality and supplies the AC power to a load.

The storage battery device 11 roughly includes a plurality of battery units 21-1 to 21-N(N is a natural number greater than or equal to 2) and a battery terminal board 22 to which the battery units 21-1 to 21-N are connected.

The battery units 21-1 to 21-N include a plurality of battery boards 23-1 to 23-M (M is a natural number greater than or equal to 2) connected in parallel to each other, a gateway device 24, and a DC power supply device 25 that supplies DC power for operation to a battery management unit (BMU) and a cell monitoring unit (CMU) to be described later.

Here, the configurations of the battery units 21-1 to 21-N will be described in detail. The battery boards 23-1 to 23-M constituting the battery units 21-1 to 21-N are connected to output power supply lines (buses) LHO and LLO via a high potential-side power supply line LH and a low potential-side power supply line LL, respectively, and supply power to the PCS 12 as a main circuit.

Since the battery boards 23-1 to 23-M have the same configuration, the battery board 23-1 will be described as an example.

The battery board 23-1 roughly includes cell modules 31-1 to 31-20, CMUs 32-1 to 32-20 provided in the cell modules 31-1 to 31-20, respectively, a service disconnect 33 provided between the cell module 31-12 and the cell module 31-13, a current sensor 34, and a contactor 35. The cell modules 31-1 to 31-20, the service disconnect 33, the current sensor 34, and the contactor 35, are connected in series.

The cell modules 31-1 to 31-20 each constitute an assembled battery in which battery cells are connected in series and parallel. The cell modules 31-1 to 31-20 connected in series constitute an assembled battery group.

Moreover, the battery board 23-1 includes a BMU 36. Communication lines of the CMUs 32-1 to 32-20 and an output line of the current sensor 34 are connected to the BMU 36.

The BMU 36 controls the entire battery board 23-1 under the control of the gateway device 24, and performs opening/closing control of the contactors 35 on the basis of a communication result with each of the CMUs 32-1 to 32-20 and a detection result of the current sensor 34. Hereinafter, the battery boards 23-1 to 23-M are simply referred to as the battery board 23 unless otherwise distinguished.

Next, a configuration of the battery terminal board 22 will be described.

The battery terminal board 22 includes board breakers 41-1 to 41-N corresponding to the battery units 21-1 to 21-N, and a master device 42 configured as a microcomputer that controls the entire storage battery device 11.

The master device 42 is connected to the PCS 12 over a control power line 51 and a control communication line 52. The control power line 51 is provided via an uninterruptible power system (UPS) 12A of the PCS 12, and the control communication line 52 is configured as Ethernet (registered trademark) to exchange control data.

Figure 3:
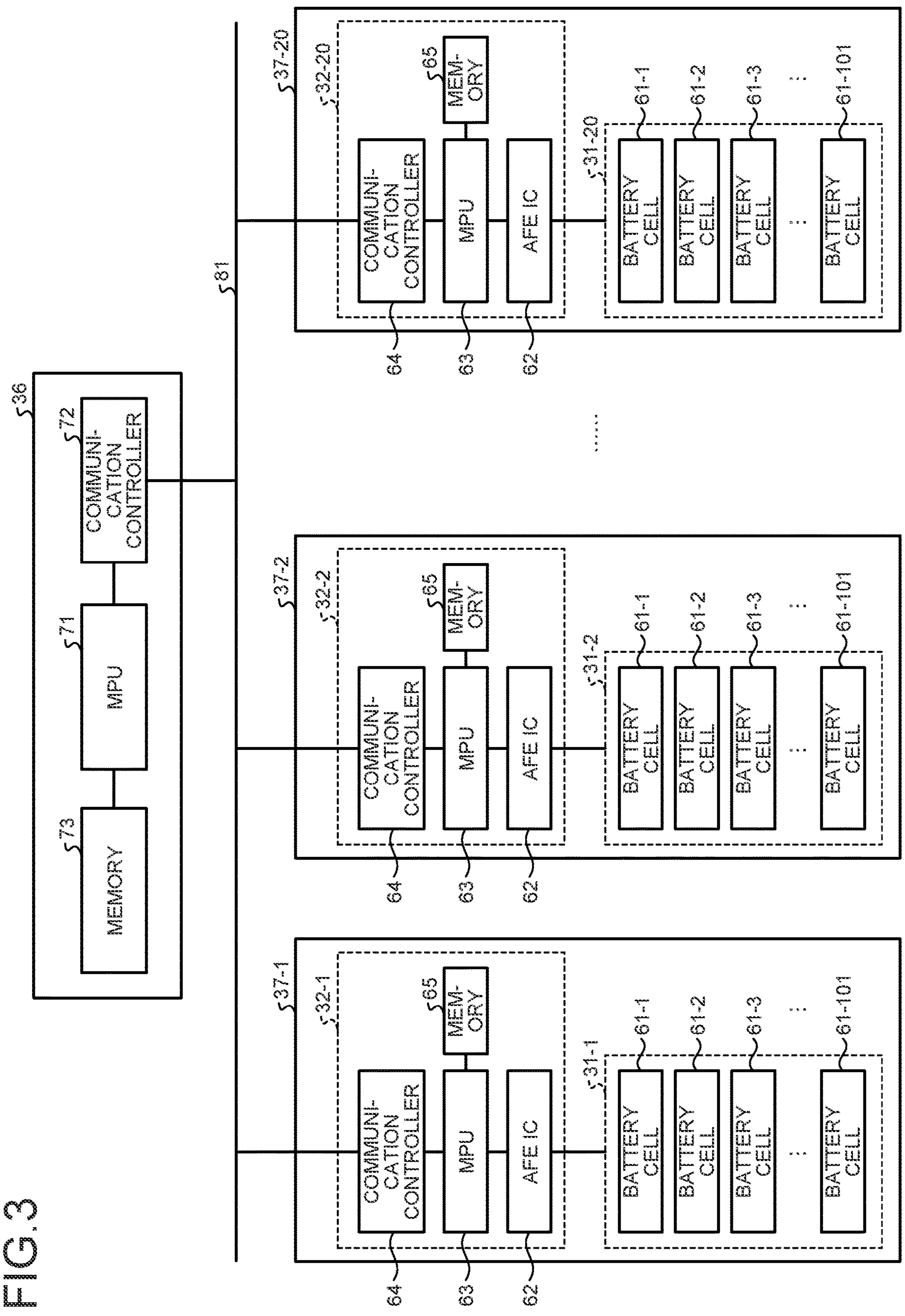
FIG. 3 is a configuration block diagram of a cell module and the like of the first embodiment.

Here, detailed configurations of the cell modules 31-1 to 31-20, the CMUs 32-1 to 32-20, and the BMU 36 will be described. FIG. 3 is a configuration block diagram of a cell module and the like of the first embodiment. As illustrated in FIG. 3, each of the cell modules 31-1 to 31-20 includes battery cells 61-1 to 61-101 connected in series.

The CMUs 32-1 to 32-20 each include: an analog front end IC (AFE IC) 62 for measuring the voltage and the temperature of a predetermined place of the battery cells constituting the corresponding cell module 31-1, . . . , or 31-20, an MPU 63 for entirely controlling a corresponding CMU 32-1, . . . , or 32-20, a communication controller 64 conforming to the controller area network (CAN) standard for performing communications via a CAN 81 with the BMU 36, and a memory 65 for storing voltage data corresponding to the voltage of each cell and temperature data.

In the following description, a combination of the cell modules 31-1 to 31-20 and the corresponding CMUs 32-1 to 32-20 will be referred to as storage battery modules 37-1 to 37-20, respectively. For instance, a combination of the cell module 31-1 and the corresponding CMU 32-1 is referred to as a storage battery module 37-1. Hereinafter, the storage battery modules 37-1 to 37-20 may be also simply referred to as the storage battery module 37 unless otherwise distinguished.

The BMU 36 includes an MPU 71 that controls the entire BMU 36, a communication controller 72 conforming to the CAN standard for performing CAN communication with the CMUs 32-1 to 32-20, and a memory 73 that stores voltage data and temperature data transmitted from the CMUs 32-1 to 32-20.

Figure 4:
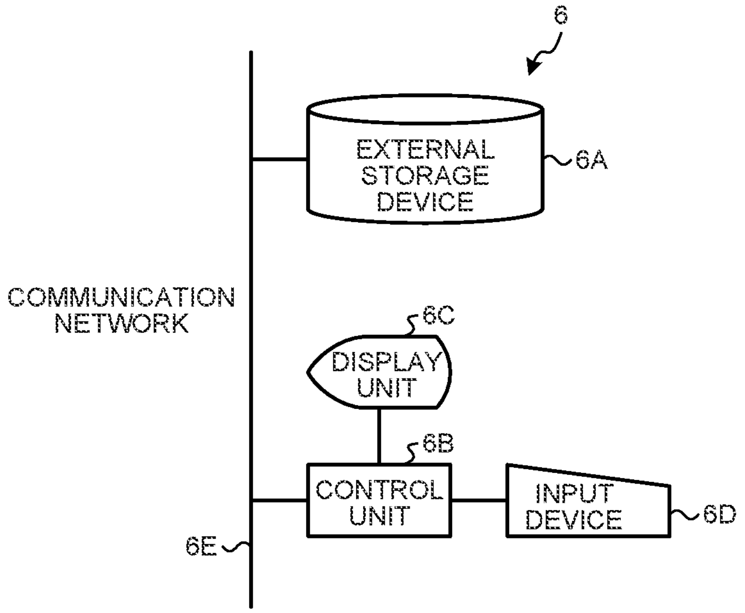
FIG. 4 is a configuration block diagram of a host control device according to the first embodiment.

FIG. 4 is a configuration block diagram of the host control device 6 according to the first embodiment. The host control device 6 is configured as a so-called computer, and includes, for example, as illustrated in FIG. 4, an external storage device 6A, a control unit 6B that controls the entire host control device 6, a display unit 6C that displays various types of information to an operator, an input device 6D for the operator to input various types of information, and a communication network 6E for performing communication between the control unit 6B and the external storage device 6A and between the control unit 6B and an external device such as the storage battery control controller 5.

For such a storage battery system 100, a degradation phenomenon of a general storage battery will be described by using an exemplary case where a lithium ion battery is used.

Battery characteristics that change due to degradation include internal resistance and battery capacity. The battery capacity illustrates a decreasing trend over time, and the internal resistance of the battery conversely illustrates an increasing trend. One of the factors of decreasing the battery capacity is an increase in internal resistance.

In general, the higher a battery temperature, the higher a degradation rate of the battery. Therefore, when the battery temperature varies in the storage battery module, degradation of the cell module having a high battery temperature is likely to proceed. For example, heat generation occurs inside the battery as the battery is charged and discharged, and the temperature of the battery increases. The heat generated from the battery tends to gather on the upper portion of the battery board, and the temperature of the battery disposed on the upper portion tends to be higher. In addition, it is also conceivable that the temperature of the adjacent battery boards increases due to heat generation or exhaust heat by a device such as the PCS 12. As described above, when the temperature distribution in the battery board varies, there is a concern that degradation of the battery cell or the storage battery module having a high battery temperature is accelerated.

As a countermeasure against such a situation, in the related art, for example, the SOH of the storage battery module is monitored, and when a storage battery module whose SOH indicates degradation is found, the storage battery module is replaced with a new storage battery module.

However, even when a storage battery module whose SOH indicates degradation is found, it is not always necessary to replace the storage battery module immediately. In addition, replacement of the storage battery module is costly. Therefore, it is meaningful to obtain information on how a remaining life of the storage battery system extends in a case where the storage battery module is replaced, before actually replacing the storage battery module.

Therefore, in the following, a technique that is capable of displaying information on how the remaining life of the storage battery system 100 extends on an assumption that at least part of the multiple storage battery modules constituting the storage battery system 100 is replaced will be described.

Figure 5:
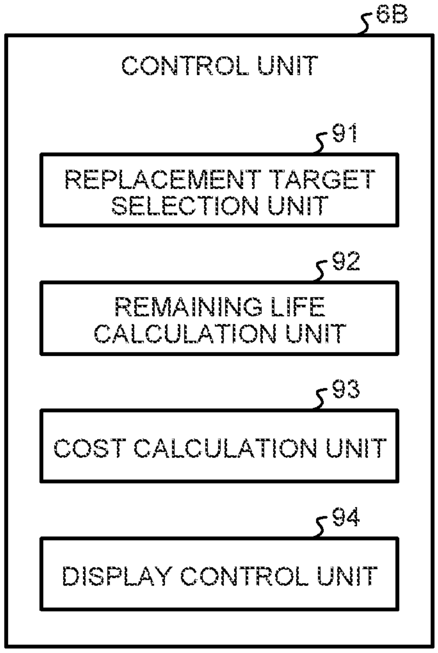
FIG. 5 is a functional configuration block diagram of a control unit of the host control device according to the first embodiment.

FIG. 5 is a functional configuration block diagram of the control unit 6B of the host control device 6 according to the first embodiment. For example, as illustrated in FIG. 5, the control unit 6B includes, as a functional configuration, a replacement target selection unit 91, a remaining life calculation unit 92, a cost calculation unit 93, and a display control unit 94.

The replacement target selection unit 91 selects the replacement target storage battery module 37 from among the storage battery modules 37 constituting the storage battery system 100. For example, the replacement target selection unit 91 selects the storage battery module 37 whose SOH indicates degradation as the replacement target storage battery module 37. Moreover, for example, the replacement target selection unit 91 may select the storage battery module 37 designated by the user as the replacement target storage battery module 37.

The remaining life calculation unit 92 calculates first remaining life information indicating the current remaining life of the storage battery system 100 on the basis of the SOH of each of the storage battery modules 37 constituting the storage battery system 100. In addition, the remaining life calculation unit 92 calculates second remaining life information indicating the remaining life of the storage battery system 100, which corresponds to a case where one or more of the storage battery modules 37 are replaced with one or more other storage battery modules. The second remaining life information is calculated on the basis of the SOH of each storage battery module 37 that is not replaced and the SOH of the other storage battery modules. The other storage battery modules may each be a new storage battery module or a reusable-article storage battery module, for example.

When calculating the second remaining life information, the remaining life calculation unit 92 may calculate second remaining life information corresponding to a case where all the storage battery modules 37 in a predetermined one of the battery boards 23 are replaced with other storage battery modules, on the basis of the SOH of each of the other storage battery modules.

The remaining life calculation unit 92 calculates the first remaining life information and the second remaining life information by simulating a charge/discharge operation of the storage battery module by using, for example, a digital model (for example, an equivalent circuit model) of the storage battery unit 4 incorporating various characteristic values of the storage battery module 37 and other storage battery modules (hereinafter, they are also simply referred to as "storage battery module"). In addition, not only the SOH of the storage battery module but also other information, such as the environmental temperature of the storage battery module, may be used for calculating the first remaining life information and the second remaining life information.

The cost calculation unit 93 calculates a cost (hereinafter, it is also referred to as "replacement cost") required for replacement, on the basis of a procurement cost of other storage battery modules to be newly installed by replacement and a replacement work cost.

The display control unit 94 causes the display unit 6C to display various types of information. For example, the display control unit 94 causes the display unit 6C to display the first remaining life information, the second remaining life information, and the replacement cost according to an operation using a user interface screen. In addition, the display control unit 94 causes the display unit 6C to display, for example, the life extension effect. The life extension effect is an effect that a time when the storage battery system 100 does not satisfy the specification is extended. Specifically, the display content of the life extension effect may be, for example, the first remaining life information and the second remaining life information, or may be the length (for example, "3 months" or the like) of the life of the storage battery system 100 extended by replacement of the storage battery module 37.

Figure 6:
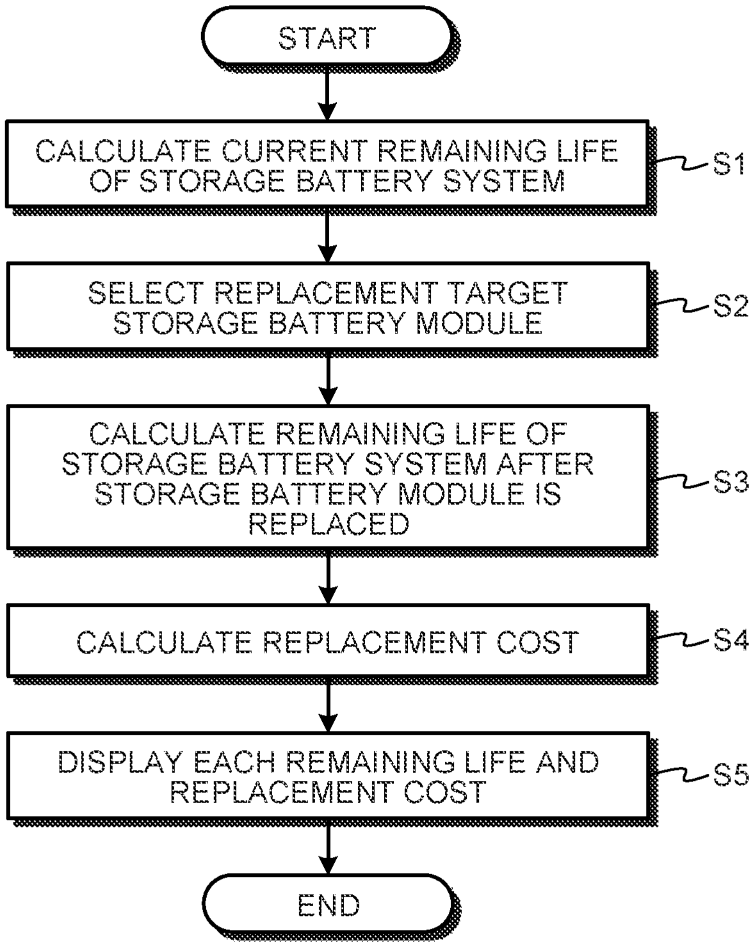
FIG. 6 is a flowchart illustrating processing of the host control device according to the first embodiment.
Figure 7:
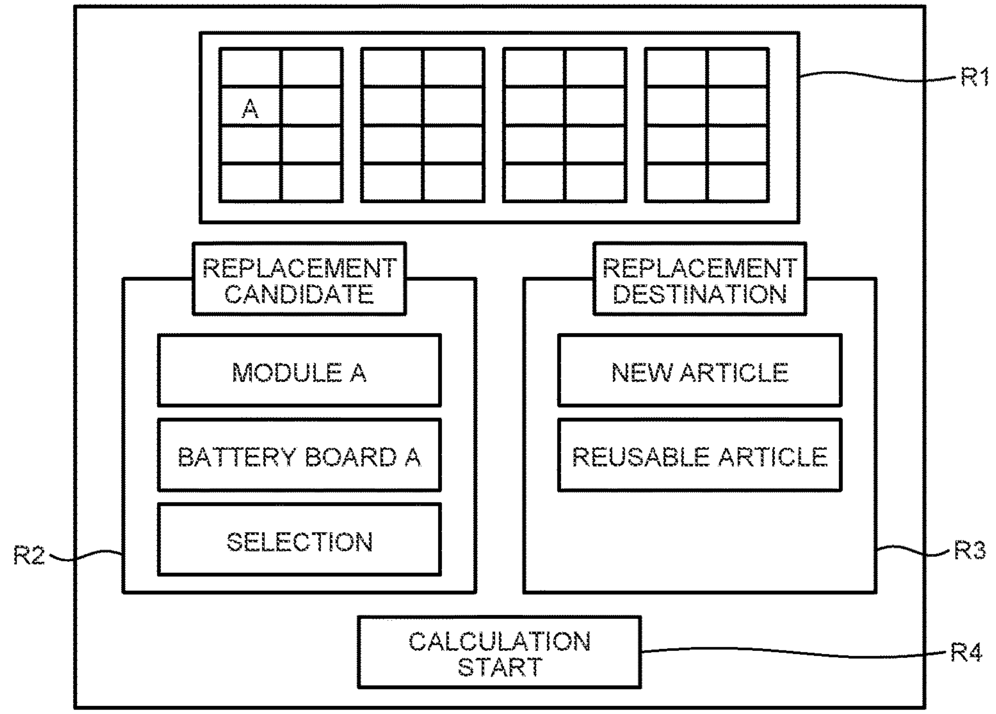
FIG. 7 is a schematic diagram illustrating a display screen example in the host control device according to the first embodiment.
Figure 7:
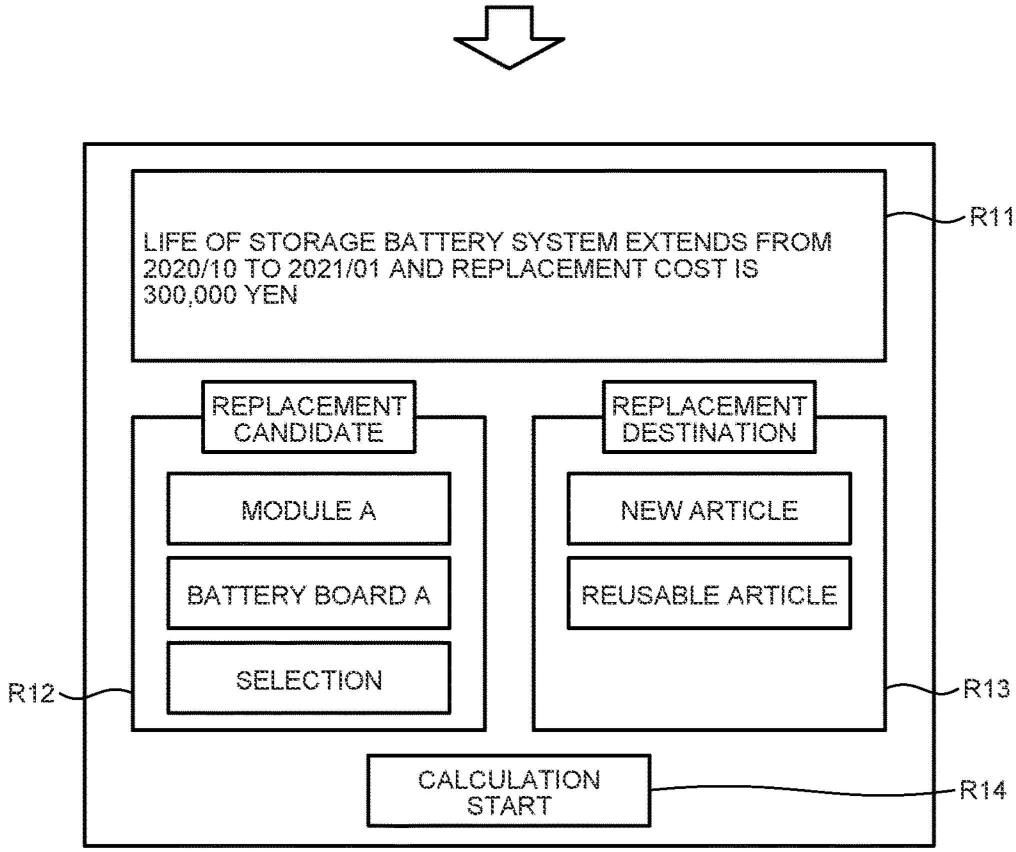

Next, processing and a display screen example of the host control device 6 according to the first embodiment will be described with reference to FIGS. 6 and 7. FIG. 6 is a flowchart illustrating processing of the host control device 6 according to the first embodiment. FIG. 7 is a schematic diagram illustrating a display screen example in the host control device 6 of the first embodiment.

First, in Step S1, the remaining life calculation unit 92 calculates first remaining life information indicating the current remaining life of the storage battery system 100 on the basis of the SOH of each of the storage battery modules 37.

Next, the user performs an operation on the screen illustrated in FIG. 7(*a*), for example. In FIG. 7(*a*), the battery board 23 including the storage battery modules 37 is schematically displayed in a region R1. In addition, "A" is displayed for a storage battery module 37 (it is also referred to as a module A) whose SOH indicates degradation.

In a region R2, the module A, the battery board A (the battery board 23 including the module A), and selection (optionally selectable) are selectively displayed as replacement candidates.

In a region R3, a new storage battery module and a reusable-article storage battery module are selectively displayed as replacement destinations.

In addition, a calculation start button is displayed in a region R4.

On such a screen, a user can complete his/her operation by selecting the replacement target from among the replacement candidates in the region R2, selecting a replaced article (new product, reusable product) from among the replacement destinations in the region R3, and then pressing the calculation start button in the region R4.

Thereafter, in Step S2, the replacement target selection unit 91 selects a storage battery module 37 as a replacement target designated by the operation from among the storage battery modules 37 constituting the storage battery system 100.

Next, in Step S3, the remaining life calculation unit 92 calculates second remaining life information indicating the remaining life of the storage battery system 100, which corresponds to a case where the storage battery module 37 as a replacement target is replaced with another storage battery module. The calculation is performed on the basis of the SOH of the storage battery module 37 that is not replaced and the SOH of the other storage battery module.

Next, in Step S4, the cost calculation unit 93 calculates a replacement cost on the basis of a procurement cost of the other storage battery module to be newly installed by replacement, and a replacement work cost.

Next, in Step S5, the display control unit 94 causes the display unit 6C to display the first remaining life information, the second remaining life information, and the replacement cost. FIG. 7(*b*) is an example of a display screen of that. In FIG. 7(*b*), the current life (2020/10), the life (2021/01) after the replacement of the storage battery module, and the replacement cost (300,000 yen) of the storage battery system 100 are displayed in a region R11.

Note that display contents of regions R12 to R14 are similar to those of the regions R2 to R4 in FIG. 7(*a*), but are not limited thereto. For example, the selected replacement target may be displayed in the region R12. Alternatively, for example, the selected article (new product, reusable product) may be displayed in the region R13.

As described above, according to the storage battery system 100 of the first embodiment, the current remaining life (first remaining life information) of the storage battery system 100 and the remaining life (second remaining life information) of the storage battery system 100 corresponding a case where the storage battery module is replaced can be calculated and displayed. As a result, the user can appropriately determine a replacement time or the like of the storage battery module 37 by looking at the information. In addition, by calculating and displaying the replacement cost together, the user can obtain more meaningful replacement cost information.

In the prior art, for example, in a case where part of a large-scale storage battery system degrades, the life of the system is extended by replacing the degrading battery. However, it is difficult for an end user to determine what effect can be obtained by paying how much cost. Therefore, by calculating and displaying the remaining life and the replacement cost described above as in the present embodiment, it is possible to present an appropriate determination criterion regarding battery replacement to the user.

In addition, not only a new storage battery module but also a reusable-article storage battery module can be selected as a replacement target, whereby a wide range of options can be presented to the user. That is, when the user selects a reusable product, the life extension effect is inferior to that of a new product, but the cost is lower.

Second Embodiment

Next, a second embodiment will be described. The same matters as those in the first embodiment will not be described repeatedly as appropriate. FIGS. 1 to 5 are the same as those in the first embodiment. The second embodiment is different from the first embodiment in that, the storage battery module 37 is not replaced with another storage battery module, but the arrangement is changed (one mode of replacement) among the storage battery modules 37.

When calculating the second remaining life information, instead of replacing one or more storage battery modules 37 with one or more other storage battery modules, the remaining life calculation unit 92 calculates the second remaining life information corresponding to a case where the arrangement of the storage battery modules 37 is changed. The calculation is performed by using the digital model on the basis of degradation progression characteristic information of the storage battery module 37 for each position in the storage battery system 100 stored in a storage unit (for example, external storage device 6A (FIG. 4)).

The degradation progression characteristic information refers to information on degradation progression characteristic of each storage battery module 37. In general, the degradation rate of the battery increases as the temperature increases, so that the degradation progression characteristic information is created on the basis of, for example, temperature distribution information of the storage battery modules 37. The progression characteristic (progression rate) of degradation varies with, for example, the position of each storage battery module 37 because the heat dissipation efficiency of heat generated during use varies and the temperature varies. Therefore, the degradation progression characteristic information can be created in advance by, for example, an experiment. When the degradation progression characteristic information is created, not only the temperature but also other elements related to degradation may be further used.

Figure 8:
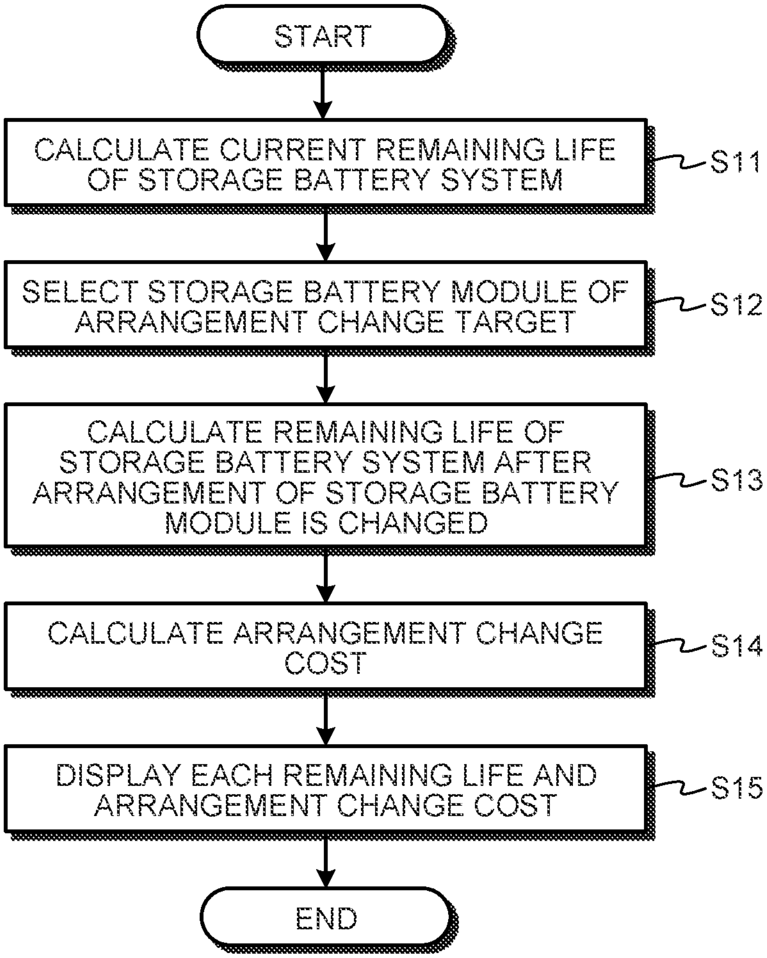
FIG. 8 is a flowchart illustrating processing of a host control device according to the second embodiment.
Figure 9:
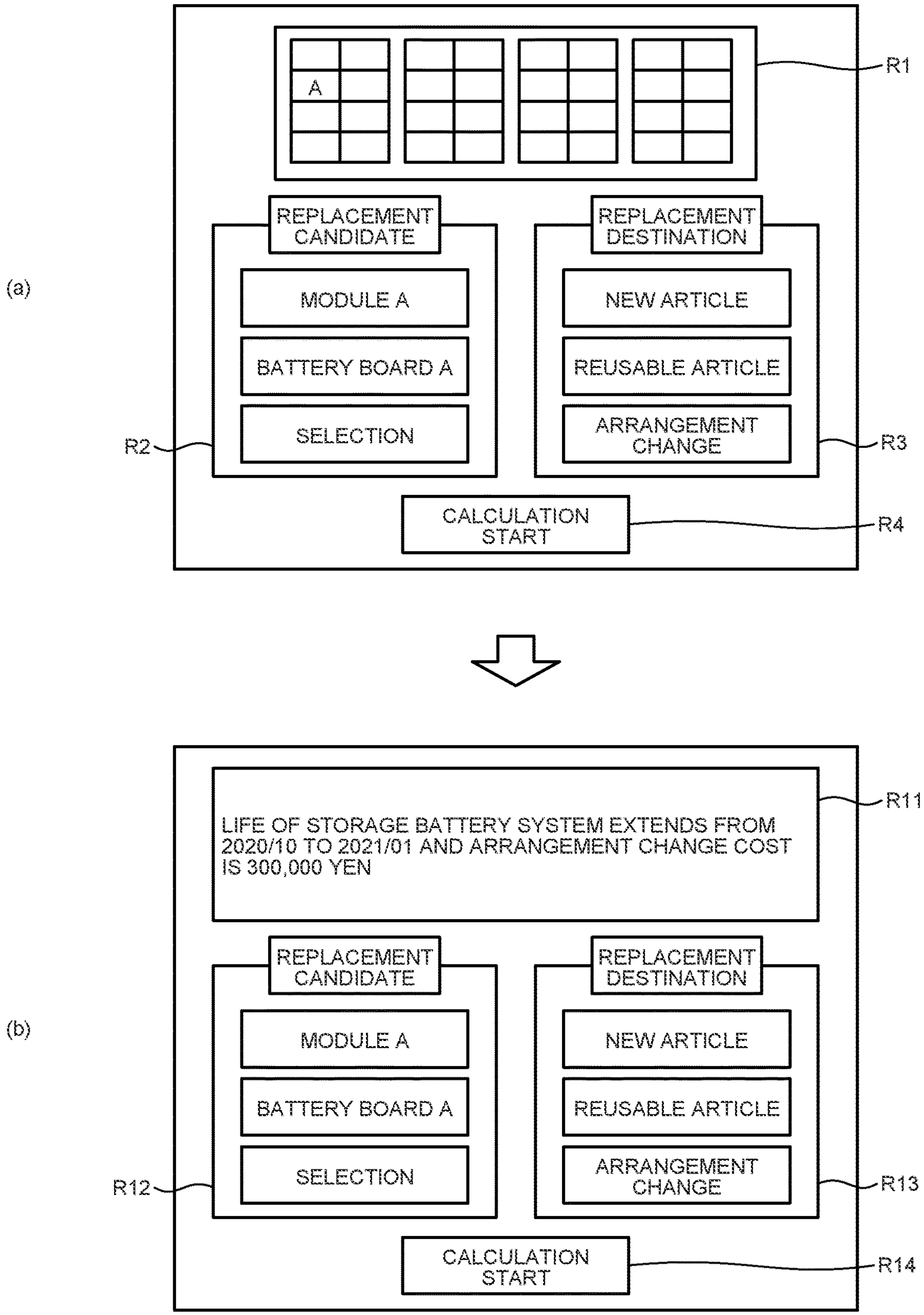
FIG. 9 is a schematic diagram illustrating a display screen example in the host control device according to the second embodiment.

Next, processing and a display screen example of the host control device 6 of the second embodiment will be described with reference to FIGS. 8 and 9. FIG. 8 is a flowchart illustrating the processing of the host control device 6 according to the second embodiment. FIG. 9 is a schematic diagram illustrating the display screen example in the host control device 6 according to the second embodiment.

First, in Step S11, the remaining life calculation unit 92 calculates the first remaining life information indicating the current remaining life of the storage battery system 100 on the basis of the SOH of each of the storage battery modules 37.

Next, for example, the user performs an operation on the screen illustrated in FIG. 9(*a*). The screen of FIG. 9(*a*) is different from the screen of FIG. 7(*a*) in that, a selection button of "arrangement change" is added to the region R3. On such a screen, the user can complete his/her operation by selecting the "arrangement change" in the region R3 and then pressing the calculation start button in the region R4.

Thereafter, in Step S12, the replacement target selection unit 91 selects the storage battery module 37 of the arrangement change target from among the storage battery modules 37 constituting the storage battery system 100.

Next, in Step S13, the second remaining life information corresponding to a case where the arrangement of the storage battery module 37 of the arrangement change target is changed is calculated on the basis of the above-described degradation progression characteristic information.

Next, in Step S14, the cost calculation unit 93 calculates an arrangement change cost. Since the arrangement of the storage battery module 37 is changed, the procurement cost of the other storage battery modules is unnecessary, and the arrangement change cost is calculated only on the basis of the work cost.

Next, in Step S15, the display control unit 94 causes the display unit 6C to display the first remaining life information, the second remaining life information, and the arrangement change cost. FIG. 9(*b*) is an example of the display screen. In FIG. 9(*b*), the current life (2020/10), the life after the arrangement change (2021/01), and the arrangement change cost (300,000 yen) of the storage battery system 100 are displayed in the region R11.

As described above, according to the storage battery system 100 of the second embodiment, the current remaining life (first remaining life information) of the storage battery system 100, the remaining life (second remaining life information) of the storage battery system 100 corresponding to a case where the arrangement of the storage battery module 37 is changed, and the arrangement change cost can be calculated and displayed. As a result, the user can appropriately determine whether to replace or change the arrangement of the storage battery module 37.

In addition, when the arrangement of the storage battery module 37 is changed, although the life extension effect may be fewer in a case of replacement with a new one, there is an advantage that the life extension effect can be obtained at low cost.

Third Embodiment

Next, a third embodiment will be described. The same matters as those in the first embodiment will not be described repeatedly as appropriate. FIGS. 1 to 4 are the same as those in the first embodiment. In the first embodiment, the first remaining life information, the second remaining life information, the replacement cost, and the like are calculated and displayed at the timing specified by the user. Meanwhile, in the third embodiment, a predetermined index value related to cost effectiveness of replacement is continuously calculated on the basis of the first remaining life information, the second remaining life information, and the replacement cost, and a determination result is displayed when the index value is greater than or equal to a predetermined threshold.

Figure 10:
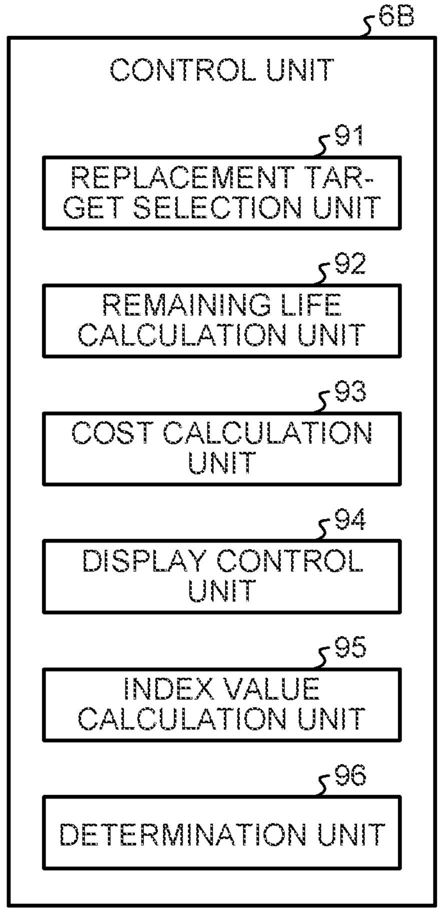
FIG. 10 is a functional configuration block diagram of a control unit of a host control device according to a third embodiment.

FIG. 10 is a functional configuration block diagram of the control unit 6B of the host control device 6 according to the third embodiment. As compared with the case of FIG. 5, an index value calculation unit 95 and a determination unit 96 are added.

The index value calculation unit 95 continuously calculates a predetermined index value related to the cost effectiveness of the replacement on the basis of the first remaining life information, the second remaining life information, and the replacement cost. The index value may be, for example, an extension time of the life of the storage battery system 100 by replacement. In addition, the index value may be a value obtained by dividing the extension time of the life of the storage battery system 100 by the replacement cost. In the following example, the index value is the extension time of the life.

The determination unit 96 determines whether the predetermined index value is greater than or equal to a predetermined threshold (for example, two months), and outputs a determination result in response to determining that the predetermined index value is greater than or equal to the threshold.

Figure 11:
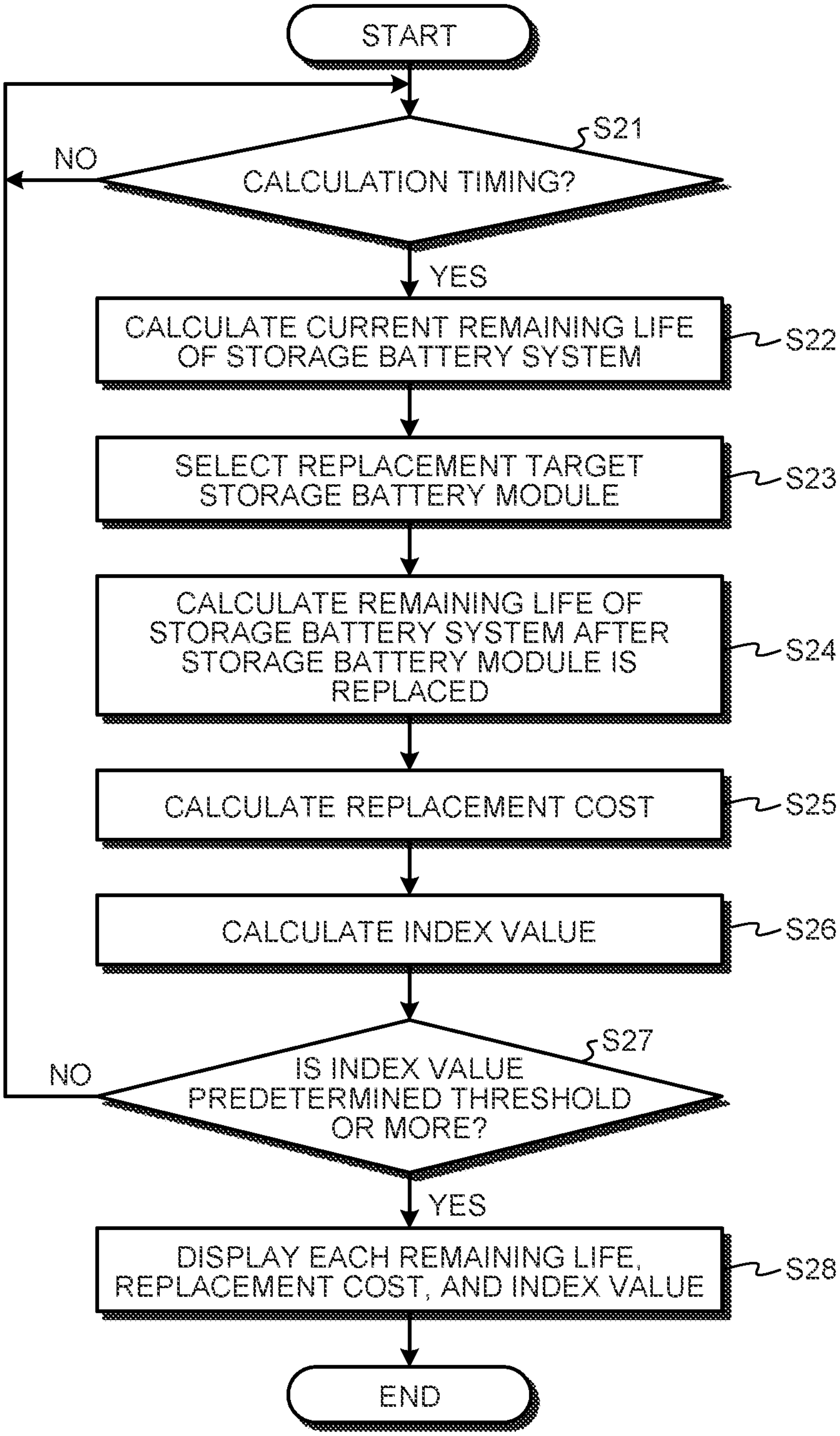
FIG. 11 is a flowchart illustrating processing of the host control device according to the third embodiment.
Figure 12:
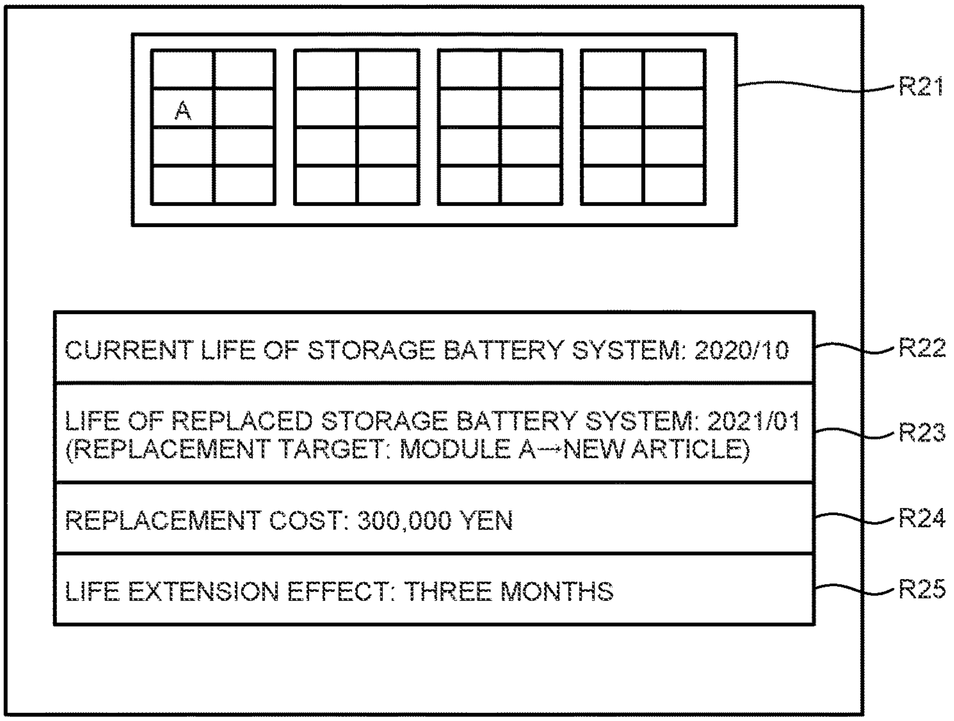
FIG. 12 is a schematic diagram illustrating a display screen example in the host control device according to the third embodiment.

Next, processing and a display screen example of the host control device 6 of the third embodiment will be described with reference to FIGS. 11 and 12. FIG. 11 is a flowchart illustrating the processing of the host control device 6 according to the third embodiment. FIG. 12 is a schematic diagram illustrating the display screen example in the host control device 6 according to the third embodiment.

First, in Step S21, the control unit 6B determines whether a calculation timing (for example, daily punctuation) has come. In a case of Yes, the step proceeds to Step S22, and in a case of No, the step returns to Step S21.

Next, in Step S22, the remaining life calculation unit 92 calculates the first remaining life information indicating the current remaining life of the storage battery system 100 on the basis of the SOH of each of the storage battery modules 37.

Next, in Step S23, the replacement target selection unit 91 selects a storage battery module 37 as a replacement target (for example, the storage battery module 37 whose SOH indicates degradation) from among the storage battery modules 37 constituting the storage battery system 100.

Next, in Step S24, the remaining life calculation unit 92 calculates the second remaining life information indicating the remaining life of the storage battery system 100, which corresponds a case where the replacement target storage battery module 37 is replaced with another storage battery module. The calculation is performed on the basis of the SOH of the storage battery module 37 that is not replaced and the SOH of the other storage battery module.

Next, in Step S25, the cost calculation unit 93 calculates the replacement cost on the basis of a procurement cost of another storage battery module to be newly installed by replacement and a replacement work cost.

Next, in Step S26, the index value calculation unit 95 calculates the index value on the basis of the first remaining life information, the second remaining life information, and the replacement cost.

Next, in Step S27, the determination unit 96 determines whether the index value (extension time of the life) is greater than or equal to a predetermined threshold (for example, two months). In a case of Yes, the step proceeds to Step S28, and in a case of No, the step returns to Step S21.

In Step S28, the display control unit 94 causes the display unit 6C to display the first remaining life information, the second remaining life information, the replacement cost, and the index value. In the display screen example illustrated in FIG. 12, the battery board 23 including the storage battery modules 37 is schematically displayed in a region R21, and the first remaining life information (the current life of the storage battery system 100), the second remaining life information (the life of the storage battery system 100 after replacement and a message that the module A is replaced with a new one), the replacement cost, and the index value (life extension effect) are displayed in regions R22 to R25.

As described above, according to the storage battery system 100 of the third embodiment, by continuously calculating the above-described index value and displaying the determination result when the index value is greater than or equal to the predetermined threshold, it is possible to automatically present meaningful information at an appropriate timing without imposing a burden on the user.

Fourth Embodiment

Next, a fourth embodiment will be described. The same matters as those in the first embodiment will not be described repeatedly as appropriate. FIGS. 1 to 4 are the same as those in the first embodiment. In the fourth embodiment, a maintenance plan for replacing the storage battery module 37 before the storage battery system 100 reaches an end of life is created and displayed.

Figure 13:
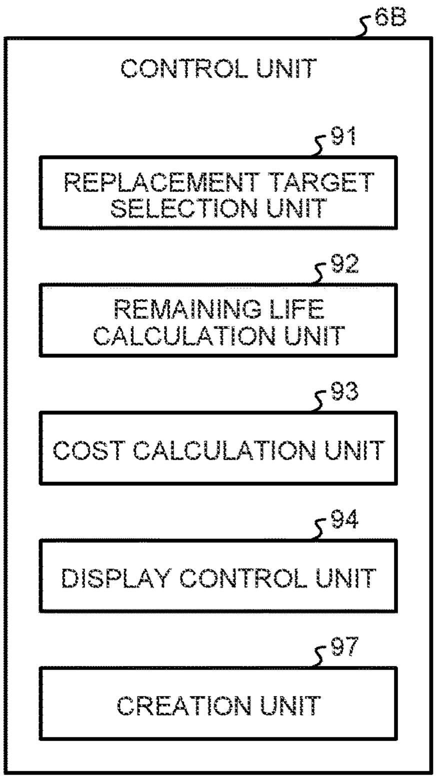
FIG. 13 is a functional configuration block diagram of a control unit of a host control device according to a fourth embodiment.

FIG. 13 is a functional configuration block diagram of the control unit 6B of the host control device 6 according to the fourth embodiment. Compared to the case of FIG. 5, a creation unit 97 is added.

The creation unit 97 creates a maintenance plan for replacing the storage battery module 37 before the storage battery system 100 reaches the end of life. The maintenance plan is created on the basis of the first remaining life information and the second remaining life information.

The display control unit 94 causes the display unit 6C to display the first remaining life information, the second remaining life information, and the maintenance plan.

Figure 14:
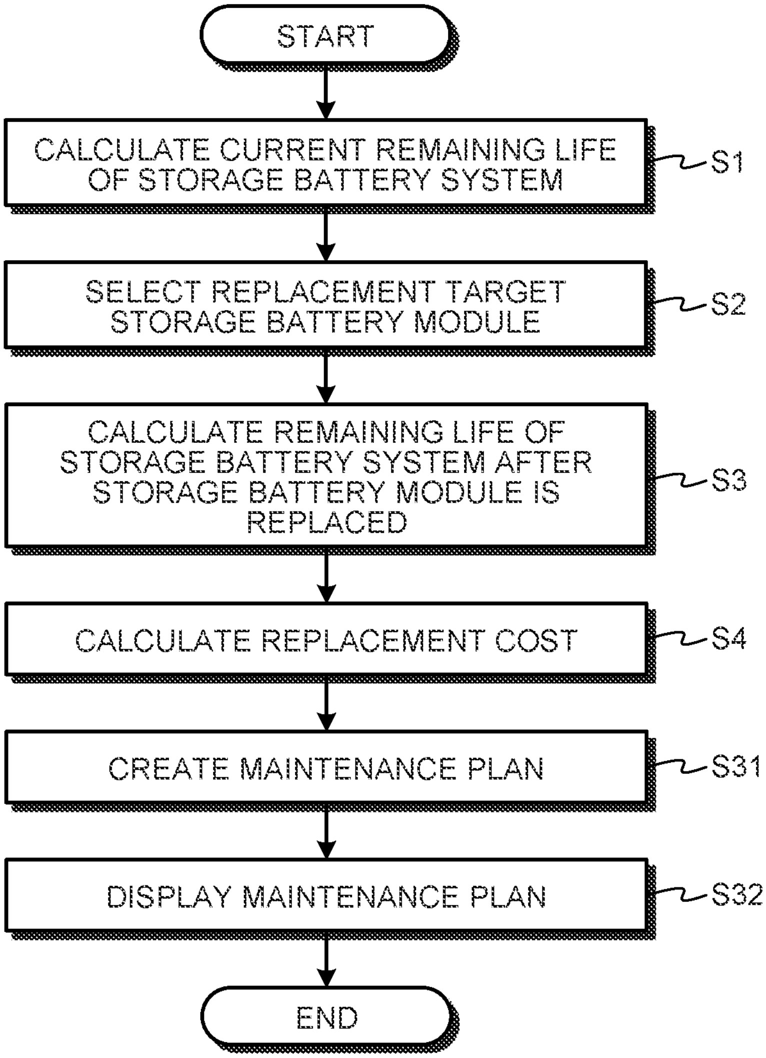
FIG. 14 is a flowchart illustrating processing of the host control device according to the fourth embodiment.
Figures 15, 16:
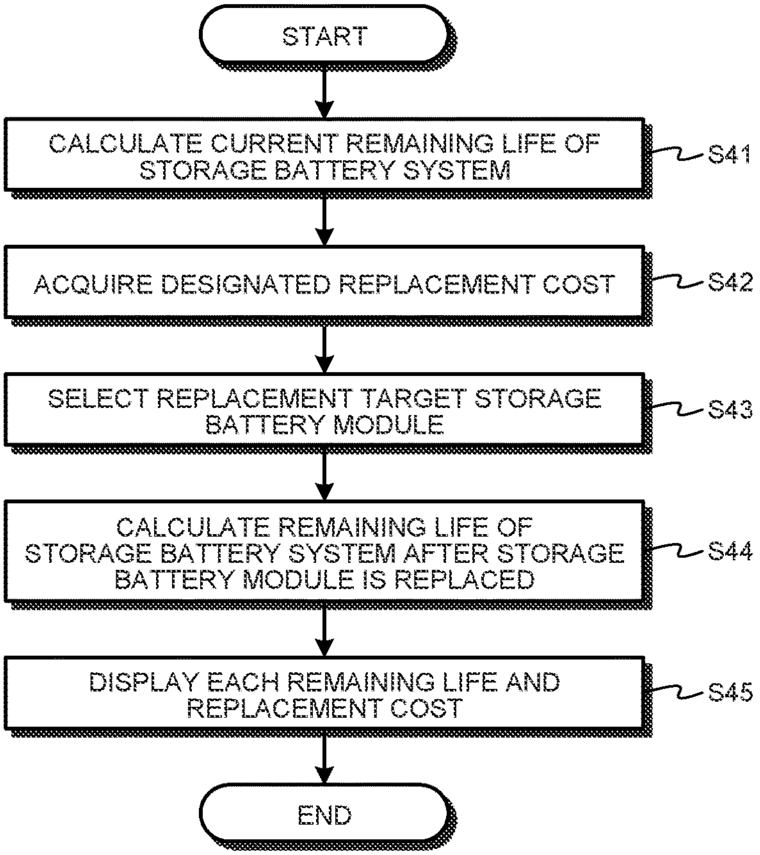
FIG. 15 is a schematic diagram illustrating a display screen example in the host control device according to the fourth embodiment.
FIG. 16 is a flowchart illustrating processing of a host control device according to a fifth embodiment.

Next, processing and a display screen example of the host control device 6 according to the fourth embodiment will be described with reference to FIGS. 14 and 15. FIG. 14 is a flowchart illustrating the processing of the host control device 6 according to the fourth embodiment. FIG. 15 is a schematic diagram illustrating the display screen example in the host control device 6 according to the fourth embodiment.

Steps S1 to S4 are similar to those in FIG. 6. After Step S4, in Step S31, the creation unit 97 creates the maintenance plan for replacing the storage battery module 37 before the storage battery system 100 reaches the end of life, on the basis of the first remaining life information and the second remaining life information.

Next, in Step S32, the display control unit 94 causes the display unit 6C to display the first remaining life information, the second remaining life information, and the maintenance plan. In the display screen example illustrated in FIG. 15, the first remaining life information (the current life of the storage battery system 100) is displayed above, and maintenance plans are displayed below the first remaining life information. Contents to be displayed for each maintenance plan are a replacement time, a replacement target, a replacement cost, a life (second remaining life information) of the replaced storage battery system 100, a life extension effect, etc.

As described above, according to the storage battery system 100 of the fourth embodiment, by creating and displaying the maintenance plans for replacing the storage battery module 37 before the storage battery system 100 reaches the end of life, the user can easily recognize and consider the maintenance plans.

Fifth Embodiment

Next, a fifth embodiment will be described. The same matters as those in the first embodiment will not be described repeatedly as appropriate. FIGS. 1 to 5 are the same as those of the first embodiment. In the fifth embodiment, the replacement target storage battery module 37 is selected on the basis of the designated replacement cost.

When the replacement cost of the storage battery module 37 is designated, the replacement target selection unit 91 selects one or more storage battery modules 37 to be replaced with one or more other storage battery modules, on the basis of the replacement cost. If there are two or more combinations of the replacement target storage battery module 37, all the combinations may be displayed so as to be selectable by the user.

The remaining life calculation unit 92 calculates the second remaining life information when the one or more storage battery modules 37 selected by the replacement target selection unit 91 are replaced with the one or more other storage battery modules. The calculation is performed on the basis of the SOH of each storage battery module 37 that is not replaced and the SOH of each of the other storage battery modules.

FIG. 16 is a flowchart illustrating processing of the host control device 6 according to the fifth embodiment. First, in Step S41, the remaining life calculation unit 92 calculates the first remaining life information indicating the current remaining life of the storage battery system 100 on the basis of the SOH of each of the storage battery modules 37.

Next, when the user designates the replacement cost by the input device 6D (FIG. 4), the replacement target selection unit 91 acquires information on the designated replacement cost in Step S42.

Next, in Step S43, the replacement target selection unit 91 selects one or more storage battery modules 37 to be replaced with one or more other storage battery modules, on the basis of the designated replacement cost.

Next, in Step S44, the remaining life calculation unit 92 calculates the second remaining life information indicating the remaining life of the storage battery system 100, which corresponds to a case where the replacement target storage battery module 37 is replaced with another storage battery module. The calculation is performed on the basis of the SOH of each storage battery module 37 that is not replaced and the SOH of each of the other storage battery modules.

Next, in Step S45, the display control unit 94 causes the display unit 6C to display the first remaining life information, the second remaining life information (information specifying the replacement target storage battery module 37 is included), and the replacement cost.

As described above, according to the fifth embodiment, the life extension effect and the like corresponding to the replacement cost designated by the user can be calculated and displayed.

Sixth Embodiment

Next, a sixth embodiment will be described. The same matters as those in the first embodiment will not be described repeatedly as appropriate. FIGS. 1 to 5 are the same as those of the first embodiment. In the sixth embodiment, the replacement cost is calculated and displayed on the basis of the designated remaining life.

When a remaining life that is longer than the remaining life in the first remaining life information is designated, the replacement target selection unit 91 selects one or more storage battery modules 37 that need to be replaced with one or more other storage battery modules in order to achieve the remaining life. The selection is performed on the basis of the SOH of each of the storage battery modules 37 and the SOH of each of the other storage battery modules.

The cost calculation unit 93 calculates the replacement cost on the basis of the procurement cost of the other storage battery modules and the replacement work cost.

Figure 17:
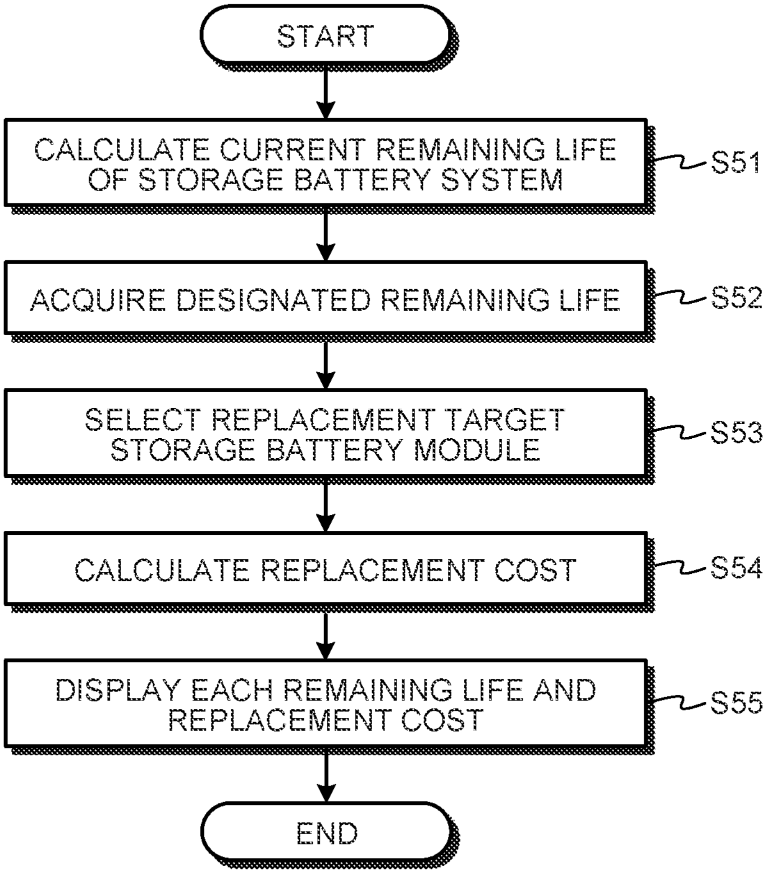
FIG. 17 is a flowchart illustrating processing of a host control device according to a sixth embodiment.

FIG. 17 is a flowchart illustrating processing of the host control device 6 according to the sixth embodiment. First, in Step S51, the remaining life calculation unit 92 calculates the first remaining life information indicating the current remaining life of the storage battery system 100 on the basis of the SOH of each of the storage battery modules 37.

Next, when the user designates the remaining life of the storage battery system 100 by using the input device 6D (FIG. 4), the replacement target selection unit 91 acquires information on the designated remaining life in Step S52.

Next, in Step S53, the replacement target selection unit 91 selects one or more storage battery modules 37 to be replaced with one or more other storage battery modules, on the basis of the designated remaining life information.

Next, in Step S54, the cost calculation unit 93 calculates a replacement cost on the basis of a procurement cost of the other storage battery modules to be newly installed by replacement and a replacement work cost.

Next, in Step S55, the display control unit 94 displays the first remaining life information, the second remaining life information (information specifying the replacement target storage battery module 37 is included), and the replacement cost on the display unit 6C.

As described above, according to the sixth embodiment, the replacement cost or the like corresponding to the remaining life designated by the user can be calculated and displayed.

The host control device 6 serving as a storage battery management device of the storage batteries of the present embodiment can have a hardware configuration using a normal computer including a control device such as a central processing unit (CPU), a storage device such as a read only memory (ROM) and a random access memory (RAM), an external storage device such as a hard disk drive (HDD) and a compact disc (CD) drive device, a display device such as a display unit, an input device such as a keyboard and a mouse, and so forth.

Therefore, the program executed by the host control device 6 functioning as the storage battery management device of the storage battery of the present embodiment can be provided by being recorded in a computer-readable recording medium such as a CD-ROM, a flexible disk (FD), a CD-R, or a digital versatile disk (DVD) as a file in an installable format or an executable format.

In addition, the program may be stored on a computer connected to a network such as the Internet and provided by being downloaded via the network. Moreover, the program may be provided or distributed via a network such as the Internet.

In addition, the program may be provided by being incorporated in a ROM or the like in advance.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

For example, the first remaining life information, the second remaining life information, the replacement cost, and so forth calculated by the host control device 6 may be displayed on a display device other than the display unit 6C installed in the host control device 6. Specifically, for example, a function other than the display function in the host control device 6 may be implemented by a cloud server, and the display function may be implemented by a computer device of the end user.

The invention claimed is:

1. A storage battery management device comprising:

a hardware processor connected to a memory, the hardware processor being configured to function as:

a display control unit to cause a display device to display first remaining life information and second remaining life information in response to an operation performed by using a user interface screen, the first remaining life information indicating current remaining life of a storage battery system and being calculated on the basis of a state of health (SOH) of each of multiple storage battery modules constituting the storage battery system, the second remaining life information indicating remaining life of the storage battery system and corresponding to a case where one or more of the multiple storage battery modules are replaced with one or more other storage battery modules, the second remaining life information being calculated on the basis of an SOH of each storage battery module not being replaced and an SOH of each of the one or more other storage battery modules;

a cost calculation unit to calculate a cost required for the replacement, the cost being calculated on the basis of a procurement cost of the other storage battery modules and a work cost of the replacement;

an index value calculation unit to continuously calculate an index value being specified in advance and related to cost effectiveness of the replacement, the index value being calculated on the basis of the first remaining life information, the second remaining life information, and the cost required for the replacement; and a determination unit to determine whether the predetermined index value is greater than or equal to a predetermined threshold, and output a determination result in response to determining that the predetermined index value is greater than or equal to the predetermined threshold, and wherein the display control unit causes the display device to further display the cost and the index value.

2. The storage battery management device according to claim 1, wherein the storage battery system includes battery boards, each of the battery boards including two or more of the multiple storage battery modules, and the display control unit causes the display device to display the first remaining life information and the second remaining life information, the second remaining life information corresponding to a case where all the two or more storage battery modules in a predetermined one of the battery boards are replaced with other storage battery modules, the second remaining life information being calculated on the basis of an SOH of the other storage battery modules.

3. The storage battery management device according to claim 1, wherein the hardware processor is configured to function as a replacement target selection unit to select a storage battery module whose SOH indicates degradation from among the multiple storage battery modules constituting the storage battery system, and the display control unit causes the display device to display the first remaining life information and the second remaining life information, the second remaining life information corresponding to a case where the storage battery module selected by the replacement target selection unit is replaced with another storage battery module, the second remaining life information being calculated on the basis of an SOH of each storage battery module not being replaced and an SOH of the other storage battery module.

4. The storage battery management device according to claim 1, wherein the one or more other storage battery modules are one or more reusable-article storage battery modules, and the display control unit causes the display device to display the first remaining life information and the second remaining life information, the second remaining life information corresponding to a case where the one or more of the multiple storage battery modules are replaced with the one or more reusable-article storage battery modules.

5. The storage battery management device according to claim 1, wherein the hardware processor is configured to function as a creation unit to create a maintenance plan for replacing the storage battery module before the storage battery system reaches an end of life, the maintenance plan being created on the basis of the first remaining life information and the second remaining life information, and the display control unit causes the display device to further display the maintenance plan.

6. A storage battery management device comprising: a hardware processor connected to a memory, the hardware processor being configured to function as:

a display control unit to cause a display device to display first remaining life information and second remaining life information in response to an operation performed by using a user interface screen, the first remaining life information indicating current remaining life of a storage battery system and being calculated on the basis of a state of health (SOH) of each of multiple storage battery modules constituting the storage battery system, the second remaining life information indicating remaining life of the storage battery system and corresponding to a case where an arrangement of the multiple storage battery modules is changed, the second remaining life information being calculated on the basis of degradation progression characteristic information of the storage battery module for each position in the storage battery system stored in a storage unit.

7. A storage battery management method comprising:

causing a display device to display first remaining life information and second remaining life information in response to an operation performed by using a user interface screen, the first remaining life information indicating current remaining life of a storage battery system and being calculated on the basis of a state of health (SOH) of each of multiple storage battery modules constituting the storage battery system, the second remaining life information indicating remaining life of the storage battery system and corresponding to a case where one or more of the multiple storage battery modules are replaced with one or more other storage battery modules, the second remaining life information being calculated on the basis of an SOH of each storage battery module not being replaced and an SOH of each of the one or more other storage battery modules;

calculating a cost required for the replacement, the cost being calculated on the basis of a procurement cost of the other storage battery modules and a work cost of the replacement;

continuously calculating an index value being specified in advance and related to cost effectiveness of the replacement, the index value being calculated on the basis of the first remaining life information, the second remaining life information, and the cost required for the replacement;

determining whether the predetermined index value is greater than or equal to a predetermined threshold;

outputting a determination result in response to determining that the predetermined index value is greater than or equal to the predetermined threshold; and causing the display device to further display the cost and the index value.

8. A non-transitory computer-readable recording medium on which programmed instructions are recorded, the instructions causing a computer to execute processing, the processing comprising:

causing a display device to display first remaining life information and second remaining life information in response to an operation performed by using a user interface screen, the first remaining life information indicating current remaining life of a storage battery system and being calculated on the basis of a state of health (SOH) of each of multiple storage battery modules constituting the storage battery system, the second remaining life information indicating remaining life of the storage battery system and corresponding to a case where one or more of the multiple storage battery modules are replaced with one or more other storage battery modules, the second remaining life information being calculated on the basis of an SOH of each storage battery module not being replaced and an SOH of each of the one or more other storage battery modules;

calculating a cost required for the replacement, the cost being calculated on the basis of a procurement cost of the other storage battery modules and a work cost of the replacement;

continuously calculating an index value being specified in advance and related to cost effectiveness of the replacement, the index value being calculated on the basis of the first remaining life information, the second remaining life information, and the cost required for the replacement;

determining whether the predetermined index value is greater than or equal to a predetermined threshold;

outputting a determination result in response to determining that the predetermined index value is greater than or equal to the predetermined threshold; and causing the display device to further display the cost and the index value.

* * * * *